(No Model.)

C. McDONAGH.
FLOWER POT MACHINE.

No. 444,009. Patented Jan. 6, 1891.

Witnesses:
A. B. Eaton
Geo. A. Gregg

Inventor
Charles McDonagh
By James Whittemore
Att'y.

UNITED STATES PATENT OFFICE.

CHARLES McDONAGH, OF TOLEDO, OHIO, ASSIGNOR OF ONE-HALF TO JOHN McCAFFREY, OF SAME PLACE.

FLOWER-POT MACHINE.

SPECIFICATION forming part of Letters Patent No. 444,009, dated January 6, 1891.

Application filed January 25, 1890. Serial No. 338,153. (No model.)

*To all whom it may concern:*

Be it known that I, CHARLES McDONAGH, a citizen of the United States, residing at Toledo, in the county of Lucas and State of Ohio, have invented certain new and useful Improvements in Flower-Pot Machinery, of which the following is a specification, reference being had therein to the accompanying drawings.

This invention relates to new and useful improvements in pottery-machines, and more especially to that class of pottery-machines designed for the manufacture of flower-pots.

This invention consists in the peculiar construction of the molds whereby more finished results are achieved, and, further, in the peculiar construction and arrangement of a spring-controlled plate for detaching the manufactured pot from the mold, and, further, in the combination, construction, and arrangement of the various parts, all as more fully hereinafter described.

Figure 1:
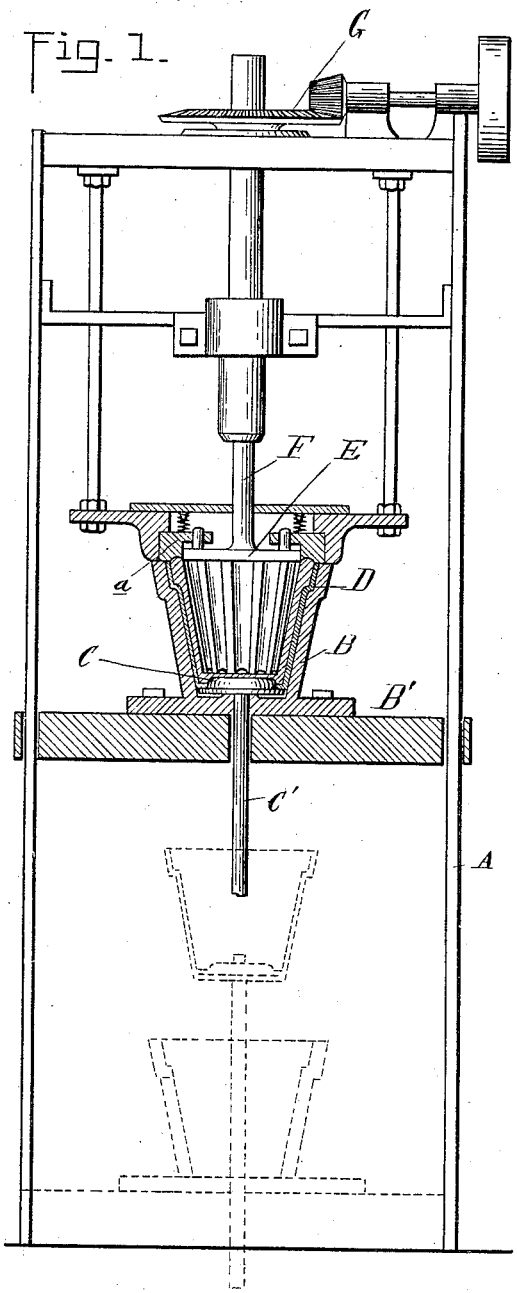
Figure 2:
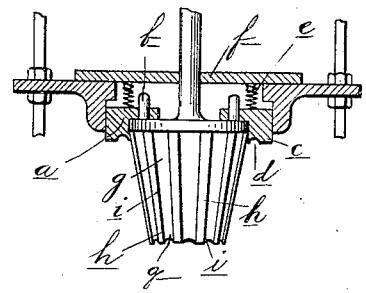
Figure 3:
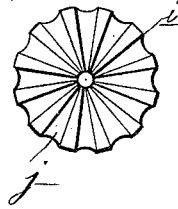

In the drawings which accompany this specification, Figure 1 is a vertical central section through the molds of a machine embodying my invention, partly in elevation. Fig. 2 is a similar section through the upper mold detached, showing the position of the parts when the pot is removed. Fig. 3 is a bottom plan view of the upper mold.

A is the frame of my machine, in which the vertical reciprocating mold B is slidingly secured, this mold being of the shape and size of the outside of the pot designed to be fashioned, and is seated upon a suitable base B'.

C is a pusher secured in the bottom of the mold upon the shaft C' and forming the bottom of the outer mold.

D is a detachable lining of a size to fit within the outer mold, and of a shape on its inner surface to give the requisite shape to the finished pot.

E is the revolving mold, secured upon the lower end of the shaft F, designed to be driven by any suitable mechanism, such as shown at G. These parts are of the same description and operation as set forth in my concurrent application, Serial No. 326,867, filed October 12, 1889.

$a$ is an annular ring-plate adjustably secured upon the mold E by suitable apertures engaging upon the pins $b$. These plates have the downwardly-projecting offset $c$, in the lower surface of which is an annular groove $d$, adapted to fit over the top of the pot and give it a curved and finished appearance.

$e$ are springs bearing with their upper ends against the plate $f$ and with their lower ends against the annular ring $a$.

$g$ are vertical grooves, preferably segmental in cross-section, arranged at equal distances around the face of the mold E, and between these segmental grooves are the slightly-curved faces $h$, curved from the axis as a center. These grooves are for the purpose of reducing the amount of surface in the rotating mold to which the clay in the mold can adhere, and, further, for forming cutting-edges $i$ on either side of the faces $h$, which will more rapidly level down any inequalities in the clay than the smooth molds heretofore used. In the bottom of the molds I arrange the radial corrugations or grooves $j$ for the same purpose.

The parts being constructed and arranged, they are intended to operate as follows: The lining D being placed in the lower mold and the clay being placed therein, the mold is raised to the position shown in full lines in Fig. 1, wherein the upper mold engages into the lower mold and bears against the inner surface of clay. The upper mold being now rotated, the pot is formed of the desired shape. As soon as the lower mold, carrying the pot, is brought to bear against the upper mold, it is evident that the upper edge of the clay will bear against the groove $d$ in the ring $a$, and that the pressure against the ring of the lower mold and the clay will compress the spring $e$ and raise the ring to the position shown in Fig. 1. As soon as the cross-head B' is lowered, and with it the lower mold, the tension of the springs $e$ will tend to depress the ring $a$ and force downward the completed pot, the tension of the springs being sufficient to overcome the adhesion of the clay to the mold. By forming the segmental grooves $g$ in the face of the upper mold I reduce the amount of surface to which the clay can adhere sufficiently, so that the tension of the springs will readily remove the completed article from the mold.

What I claim as my invention is—

1. In a pottery-machine, the rotary mold having segmental grooves $g$ and curved faces $h$, substantially as described.

2. In a pottery-machine, the rotary mold having segmental grooves $g$, curved faces $h$, and radial corrugations or grooves $j$ on its bottom, substantially as described.

3. In a pottery-machine, the combination, with the rotary mold having vertical pins on its upper face, of an apertured collar through which the pins pass, a plate above the mold, and springs interposed between the plate and collar, substantially as described.

4. In a pottery-machine, the combination, with a vertically-movable mold and a rotating mold, of a stationary plate above the latter, a grooved angular collar on the rotary mold, and springs interposed between the collar and plate, substantially as described.

In testimony whereof I affix my signature, in presence of two witnesses, this 19th day of December, 1889.

CHAS. McDONAGH.

Witnesses:
W. B. O'DOGHERTY,
JAMES WHITTEMORE.